Oct. 10, 1933.  J. F. COOK  1,929,481
MOTOR VEHICLE CHASSIS
Filed July 5, 1929
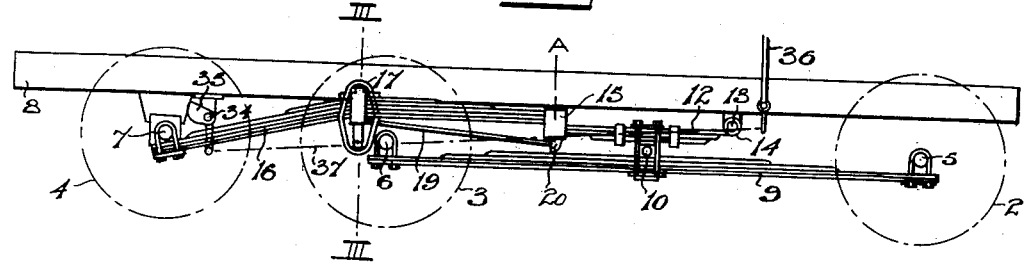
Fig. I
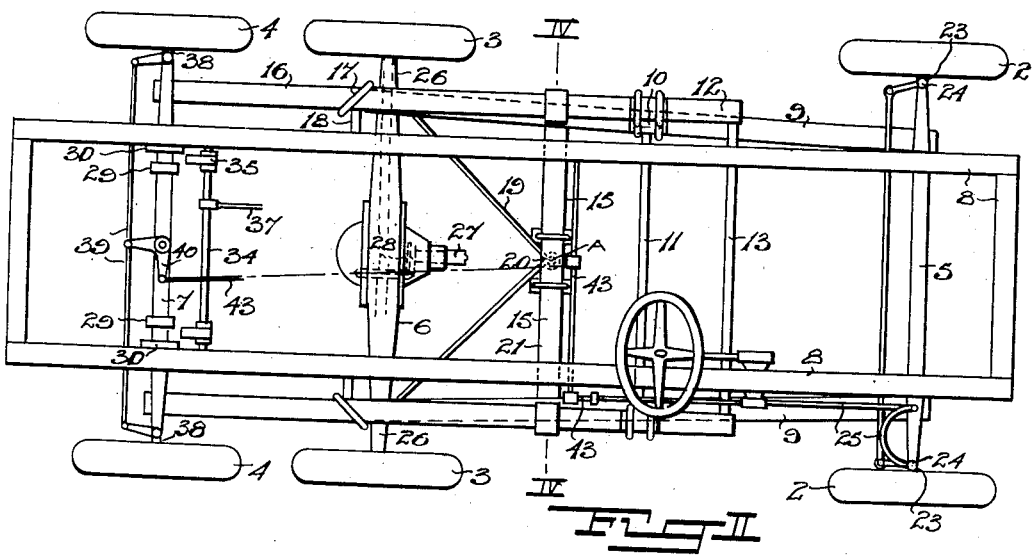
Fig. II
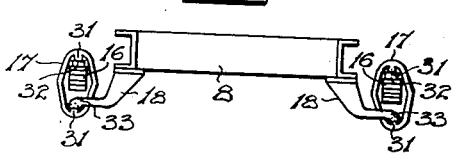
Fig. III
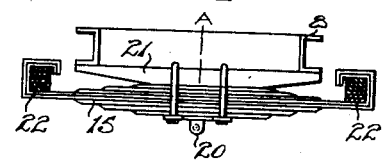
Fig. IV
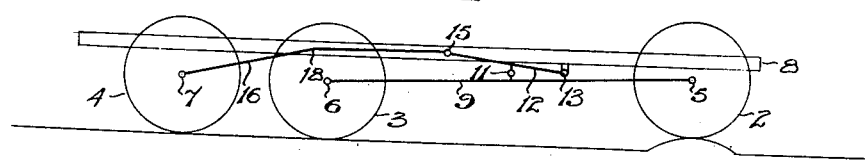
Fig. V
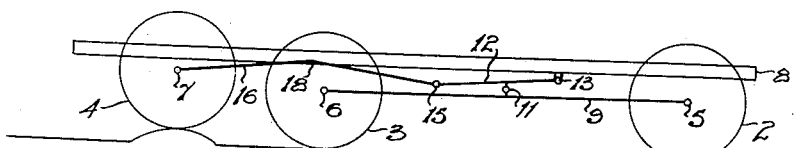
Fig. VI
INVENTOR
Junius Ford Cook
By: Cheever & Cox
ATTY Patented Oct. 10, 1933

1,929,481

UNITED STATES PATENT OFFICE 1,929,481

MOTOR VEHICLE CHASSIS

Junius Ford Cook, Johannesburg, Transvaal, Union of South Africa

Application July 5, 1929. Serial No. 375,909

27 Claims. (Cl. 280—104)

The present invention relates to chassis of motor vehicles; the principal purpose being to provide a vehicle having three or more wheel-carrying axles connected to one another and to the main frame that vertical movement of any one of them is transmitted to the main frame at a plurality of spaced points and with reduced amplitude at each point, thereby minimizing the transmission of shocks from the wheels to the main frame, insuring that the frame is carried in a more uniform state of balanced equilibrium and assisting to maintain proper contact of the wheels with the road. Another purpose is to minimize scuffing of the additional wheels when the vehicle is rounding a curve in the case of a vehicle having more than two axles.

The invention is illustrated in the accompanying drawing in which

Figure I is a side view of a vehicle embodying my present invention;

Figure II is a plan view of the vehicle illustrated in Figure I;

Figure III is a cross-sectional view taken substantially along the line III—III in Figure I;

Figure IV is a cross-sectional view taken substantially along the line IV—IV in Figure II; and Figures V and VI are diagrams.

To illustrate my invention, I have shown, on the drawing, a vehicle chassis provided with a plurality of pairs of wheels 2, 3, and 4, mounted respectively on axles 5, 6 and 7. I prefer to arrange one axle 5 at the front of the vehicle and the two axles 6 and 7 rather closely together rearwardly of the front axle.

The vehicle comprises a main frame 8 upon which the body is or may be mounted. The frame is carried in part on a beam suspension frame, the longitudinal or side members of which preferably comprise the elongated leaf spring members 9, and the cross members of which are constituted by the front axle $f$ and the intermediate axle 6, to which axles the side members 9, 9 are secured.

The members 9 carry bearings 10 by which a rocking suspension frame is pivotally mounted on the beam suspension frame. This rocking suspension frame comprises the cross shaft 11 carried in the bearings 10 and the side or longitudinal members 12 secured to the ends of the shaft 11. The forward ends of the members 12 are secured to a second cross shaft 13 mounted to oscillate in bearings 14 on the main frame 8. 15 is the rear cross member of the rocking suspension frame.

There is also provided a cantilever suspension frame comprising the side or longitudinal members 16, secured to the back axle, 7 which constitutes the rear cross member of this suspension frame. At an intermediate point in the length of each, the side members 16 support the frame 8 by means, in the case shown, of shackles 17, from which brackets 18 on the main frame are suspended; fore and aft movement being prevented by a radius rod 19 secured to the members 16 and ball jointed to the main frame at 20. The forward end of this suspension frame rests upon the rear end of the rocking suspension frame; their contact being so arranged that each frame can tilt fore and aft independently of the other. This may evidently be accomplished by providing the adjacent ends of these two frames each with its own cross end member and connecting such members by ordinary shackles. In view, however, of the necessity of providing a stabilizing spring, the action of which is described hereafter, it is preferred to provide a single member 15 which functions as the stabilizing spring and also as the common end cross member of the cantilever and the rocking suspension frames.

This member 15 accordingly consists of a double ended leaf spring as shown in Fig. IV, clamped to a rigid cross member 21 of the main frame, and adapted to resist flexure both up and down. The ends of the long leaves of this spring are turned over to form pockets 22 in which the ends of the frame members rest, with the rear frame end resting on the intermediate frame end.

It will be evident upon reference to Figs. V and VI that, considered in elevation, the construction described constitutes a system of three levers, each lever being the side member of one of the suspension frames. This lever system supports the body at the two points 13 and 18, and is actuated by vertical movement of any axle to divide such movement and distribute its fractions to the points 13 and 18; the proper distribution of the movement to one and the other of these points being ensured by the stabilizing spring 15.

Thus if only the front axle 5 is thrown up by an obstruction in the road, as indicated in Fig. V, its movement is not transmitted in the usual way, directly to the fore part of the main frame. The suspension frame 9 tilts about the axle 6 and causes a vertical movement of the cross shaft 11 of less amplitude than the movement of the axle 5. This reduced movement is transmitted to the ends 13 and 15 of the frame 9; part lifting the main frame directly at 13 and part—due to the clockwise tilting of the frame 12 about 11—lifting the frame point 18 through the suspension frame 16.

Similar action takes place when axle 6 is thrown up.

When the rear axle 7 is thrown up (Fig. VI) the suspension frame 16 lifts the frame directly at 18 with reduced amplitude. Said suspension-frame 16 also tilts clockwise, depressing the rear end of the suspension frame 12 which tilts anti-clockwise about the point 11 and raises the main frame at the point 13.

The system of levers above described is itself indeterminate as to position. It is the function of the stabilizing spring 15 to render it determinate. If for instance the main frame is unevenly loaded with the excess towards the front, the sub-frame 12 tends to tilt clockwise and so causes upward flexure of the spring 15 upwardly, which checks and limits such tilting movement. Similarly depression of the rear end of the main frame is checked by downward flexing of the spring 15.

It will be seen that the spring 15 takes part in the springing of the main frame 8 because it forms a yielding abutment against which the lever system works. Further springing of the main frame may be provided for by making the several suspension frames of rigid construction and providing separate springs at any points appropriate to make the connections between the axles and the main frame resilient.

It is preferred however to provide for the main springing by constructing all the side members 9, 12 and 16 of the suspension frames for part or the whole of their length as leaf springs as shown in the drawing. This enables the use of long leaf springs which are specially effective for minimizing the transmission of shocks to the main frame, and which facilitate the transverse tilting of the axles.

Various arrangements for driving and steering the wheels may be adopted, but it is preferred to steer the front wheels 2 manually and to drive through the intermediate wheels 3. With this object the front wheels 2 are shown as mounted upon the usual stub axles 23 pivoted at 24 and controlled by the usual steering gear indicated generally by 25.

Similarly the wheels 3 are shown as each secured to an axle shaft 26, the said axle shaft 26 being driven from a propellor shaft 27 through differential gearing 28.

It is preferred to make provision whereby when the vehicle is travelling in a curve the rear wheels 4 assume positions in which they have true rolling motion about the centre of movement determined by the relative angular positions of the wheels 2, 2 and 3, 3; thereby minimizing the scuffing of the tyres on the road which occurs in existing six wheeled vehicles in which the two rear axles are rigidly connected except for a capacity for relative lateral tilting.

With this object the rear axle 7 is permitted limited endwise play, which is conveniently a swinging movement about the vertical axis A passing through the centre of the stabilizing spring 15, and is provided for by the radius rod 19 secured to the frame 16 and ball jointed to the main frame at 20. The extent of this movement is limited by stops 29 on the axle engaging buffers 30 on the main frame.

To permit this swinging movement, the shackles 17 are formed as open links fitted with a spherical bearing 31 at each end. Said spherical bearings seat respectively in a socket 32 on the frame member 16 and in a socket 33 in the bracket 18. The shackles 17 are disposed obliquely in plan to encompass both the bracket 18 and the member 16. The shackles are splayed outwards as appears from Fig. III so that upon the axle 7 being displaced towards either side of the vehicle, it tends automatically to return to its central position. The arrangement described causes the rear wheels to have a castor action whereby they tend to take a path in which they roll without scuffing. As this castor action is undesirable when the vehicle is being backed, means may be provided for locking the axle in its mid position such as a rotatable shaft 34 carrying wedge-shaped stops 35 which upon rotation of the shaft 34 occupy the gaps between the stops 29 and the buffers 30. This shaft 34 may be actuated from a lever 36 at the driving position operating through connections 37.

It is desirable also to steer the rear wheels manually and correspondingly with the front wheels. They are accordingly mounted on stub axles 38 which are connected by links 39 to the bell crank 40 mounted on the axle 7. Said bell crank is in turn coupled to the steering mechanism 25 by connections indicated generally by 41.

I claim:

1. A vehicle comprising at least three axles, a main frame, a suspension frame extending between two of the axles, a second suspension frame connected to the third axle and connected to the main frame, a third suspension frame pivotally mounted between its ends on the first suspension frame and connected, at points on opposite sides of its point of connection with the first frame, respectively to the main frame and to the second suspension frame.

2. A vehicle comprising at least three axles, a main frame, a suspension frame extending between two adjacent axles, a second suspension frame connected to the third axle and connected to the main frame, a third suspension frame pivotally mounted between its ends to the first suspension frame and connected at its ends respectively to the main frame and to the second suspension frame.

3. A vehicle comprising at least three axles, a main frame, a suspension frame extending between two of the axles, a second suspension frame connected at one end to the third axle and intermediately connected to the main frame, and a third suspension frame arranged to rock on the first suspension frame and connected at one end to the main frame at a position longitudinally spaced from the connection of the second suspension frame with the main frame, and at the other end to the end of the second suspension frame opposite to that at which the third axle is connected.

4. In a vehicle, the combination of at least three axles, a main frame, a suspension frame connecting two adjacent axles, a cantilever suspension frame connected at one end to the third axle and swingingly connected at a longitudinally intermediate position to the main frame, and a rocking suspension frame mounted to rock on the first suspension frame and connected at its ends respectively to the end of the cantilever frame and to the main frame distantly from the connection of the cantilever suspension frame therewith, the structure including a spring resisting vertical displacement, relatively to the main frame, of the connected ends of the cantilever suspension frame and the rocking suspension frame.

5. In a vehicle, the combination of at least three axles, a main frame, a suspension frame connecting two adjacent axles, a cantilever suspension frame connected at one end to the third axle and swingingly connected at a longitudinally intermediate position to the main frame, and a rocking suspension frame mounted to rock on the first suspension frame and connected at its ends respectively to the end of the cantilever frame and to the main frame distantly from the connection of the second suspension frame therewith, the structure including a transverse spring adapted to resist flexure upward and downward, secured to the main frame, and having means at its ends for shackling the connected ends of the second suspension frame and the rocking frame.

6. A vehicle comprising at least three axles, a main frame, a suspension frame comprising the two front axles and longitudinal spring members connecting them, a cantilever suspension frame comprising cantilever springs connected to the third axle and rockingly connected at intermediate points to the main frame and a rocking suspension frame of spring construction mounted to rock on the first suspension frame and pivotally connected at its ends respectively to the main frame and the cantilever frame.

7. In a vehicle, the combination of a main frame, an axle capable of endwise movement relative to the main frame, cantilevers forming a support between said axle and said main frame and shackles having universely jointed end connections to the frame and to intermediate points of the cantilevers.

8. The subject matter of claim 7 in which the lower portions of the shackles are connected to the frame and are splayed outwardly of the shackle portions connected with the cantilevers.

9. In a vehicle, a main frame, a suspension frame pivoted to said main frame and a plurality of wheel carrying frames swingingly connected to the suspension frame, one of said frames having connection with the main frame solely through the intermediary of the suspension frame.

10. In a vehicle, a main frame, a suspension frame pivoted to said main frame and a pair of wheel carrying frames pivoted to said suspension frame at spaced apart points in the suspension frame on one side of its connection with the main frame.

11. In a vehicle, a main frame, a suspension frame pivoted at one end to said main frame, a wheel supporting frame pivoted to said suspension frame at its opposite end and a second wheel carrying frame pivotally mounted to said suspension frame intermediate its ends.

12. In a vehicle, a main frame, a wheel carrying frame having a free end, an auxiliary suspension frame pivoted to said main frame and extending to and pivotally engaging the free end of said wheel carrying frame and a second wheel carrying frame mounted to said auxiliary frame between the points at which the auxiliary frame is connected with the main frame and the said first wheel carrying frame.

13. A vehicle comprising at least three axles, a main frame, a suspension frame extending between two of the axles, a second suspension frame connected to the third axle and swingably connected to the main frame, and a third suspension frame pivotally mounted between its ends on the first suspension frame and connected at its ends to the main frame, and the second suspension frame, the structure including stabilizing mechanism yieldingly resisting relative displacement of the frames.

14. A vehicle comprising at least three axles, a main frame, a suspension frame extending between two adjacent axles, a second suspension frame connected to the third axle and swingably connected to the main frame, and a third suspension frame pivotally mounted between its ends on the first suspension frame and connected at its ends to the main frame and the second suspension frame, the structure including stabilizing mechanism yieldingly resisting relative displacement of the frames.

15. A vehicle comprising at least three axles, a main frame, a suspension frame extending between two of the axles, a second suspension frame connected at one end to the third axle and intermediately swingably connected to the main frame, and a third suspension frame arranged to rock on the first suspension frame and connected at one end to the main frame at a position longitudinally spaced from the connection of the second suspension frame with the main frame, and at the other end to the end of the second suspension frame opposite to that at which the third axle is connected, the structure including stabilizing mechanism yieldingly resisting relative displacement of the frames.

16. A vehicle comprising at least three axles, a main frame, a suspension frame comprising the two front axles and longitudinal spring members connecting them, a cantilever suspension frame comprising cantilever springs connected to the third axle and connected at intermediate points to the main frame, and a rocking suspension frame of spring construction mounted to rock on the first suspension frame and pivotally connected at its ends respectively to the main frame and the cantilever frame, the structure including stabilizing mechanism yieldingly resisting relative displacement of the frames.

17. A vehicle comprising a main frame, three or more axles, a plurality of interconnected suspension frames forming a resilient chassis suspension system between the axles and the main frame, said suspension frames being connected for relative angular movement with respect to one another and being also pivotally connected to the main frame at two spaced points so as to transmit vertical movement of any axle to the main frame at such two points, certain of said suspension frames being connected centrally of the main frame to provide stabilizing means yieldingly resisting deformation of the system from a neutral relative positioning of its parts.

18. A vehicle comprising a main frame, three or more axles and means for connecting the axles to the frame, said means comprising a plurality of interconnected suspension frames forming a resilient chassis suspension system between the axles and the main frame, said suspension frames being connected for relative angular movement with respect to one another and being also connected to the main frame at the two spaced points so as to transmit vertical movement of any axle to the main frame at such two points.

19. In a vehicle a main frame, a suspension frame carried by the main frame and a plurality of wheel carrying frames mounted to the suspension frame, one of said wheel carrying frames having connection with the main frame solely through said suspension frame.

20. In a vehicle a main frame, a suspension frame carried by the main frame and a plurality of wheel carrying frames mounted to the suspension frame, at least three wheel carrying axles mounted to said frames and at least one of said wheel carrying frames having connection with the main frame solely through said suspension frame.

21. A vehicle comprising a main frame, three or more axles and means for connecting the axles to the frame, said means comprising a plurality of interconnected suspension frames forming a resilient chassis suspension system between the axles and the main frame, said suspension frames being connected for relative angular movement with respect to one another and being also connected to the main frame at the two spaced points so as to transmit vertical movement of any axle to the main frame at such two points, one of said sub-frames having connection with the main frame only through said suspension frame.

22. In a vehicle a main frame, a suspension frame rotatably connected to the main frame, a wheel carrying frame connected to the suspension frame, said wheel carrying frame pivotally connected intermediate its ends to the suspension frame, a plurality of wheel carrying axles mounted on the wheel carrying frame and a second wheel carrying frame pivoted to the main frame and having portions reacting against the suspension frame whereby all of the axles in the system may effect the main frame at the same points of contact.

23. A vehicle comprising a main frame, at least three axles, and suspension frames on which the axles are fixed and some of which are pivotally connected to the main frame, and to one another, the suspension frames being connected to the main frame pivotally at two longitudinally separated points only, and at a third point by means of a stabilizing spring, and being so connected together that vertical movement of any axle is transmitted to both points of pivotal connection to the main frame.

24. In a vehicle as claimed in claim 23, a beam suspension frame extending between two of the axles, a cantilever suspension frame connected to the third axle and pivotally connected at an intermediate point to the main frame, and a rocking suspension frame pivoted on the beam suspension frame and pivotally connected at its ends respectively to the main frame and to the cantilever suspension frame.

25. A construction as claimed in claim 23, having a beam suspension frame extending between two of the axles, a cantilever suspension frame connected to the third axle and pivotally connected at an intermediate point to the main frame, and a rocking suspension frame pivoted on the beam suspension frame and pivotally connected at its ends respectively to the main frame and to the cantilever suspension frame, said cantilever suspension frame and the rocking suspension frame having a common end member.

26. A construction as claimed in claim 23, having a beam suspension frame extending between two of the axles, a cantilever suspension frame connected to the third axle and pivotally connected at an intermediate point to the main frame, and a rocking suspension frame pivoted on the beam suspension frame and pivotally connected at its ends respectively to the main frame and to the cantilever suspension frame, said cantilever suspension frame and the rocking suspension frame having a common end member, comprising the stabilizing spring yieldingly connecting said suspension frames to the main frame.

27. Apparatus as claimed in claim 23 in which the side members of any or all of the frames are formed partly or wholly as springs.

JUNIUS FORD COOK.